(12) United States Patent
Bremicker et al.

(10) Patent No.: US 9,450,512 B2
(45) Date of Patent: Sep. 20, 2016

(54) METHOD FOR THE OPERATIONAL CONTROL OF AN INVERTER

(71) Applicant: SMA Solar Technology AG, Niestetal (DE)

(72) Inventors: Sven Bremicker, Alheim (DE); Karel De Brabandere, Kassel (DE); Tobias Mueller, Escherode (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 518 days.

(21) Appl. No.: 13/645,983

(22) Filed: Oct. 5, 2012

(65) Prior Publication Data

US 2013/0099571 A1 Apr. 25, 2013

Related U.S. Application Data

(63) Continuation of application No. PCT/EP2011/055343, filed on Apr. 6, 2011.

(30) Foreign Application Priority Data

Apr. 7, 2010 (EP) .................................. 10159233

(51) Int. Cl.
*H02M 7/42* (2006.01)
*H02M 1/32* (2007.01)
*H02M 7/487* (2007.01)
(Continued)

(52) U.S. Cl.
CPC ............... *H02M 7/42* (2013.01); *H02M 1/32* (2013.01); *H02M 7/487* (2013.01); *H02J 3/383* (2013.01); *H02M 2001/0025* (2013.01);
(Continued)

(58) Field of Classification Search
CPC ........................... H02M 7/5387; H02M 7/42

USPC ............................ 363/109, 95; 307/43, 104
See application file for complete search history.

(56) References Cited

U.S. PATENT DOCUMENTS 6,611,441 B2  8/2003 Kurokami et al.
7,215,559 B2  5/2007 Nondahl et al.
(Continued)

FOREIGN PATENT DOCUMENTS

CN    1669208 A      9/2005
EP    1235339 A2 *  8/2002
(Continued)

OTHER PUBLICATIONS

Julian, et al. "Elimination of Common-Mode Voltage in Three-Phase Sinusoidal Power Converters." IEEE Transactions on Power Electronics, vol. 14, No. 5. Sep. 1999. 8 Pages.
(Continued)

*Primary Examiner* — Kenneth B Wells
*Assistant Examiner* — Rafael Pacheco
(74) *Attorney, Agent, or Firm* — Eschweiler & Associates, LLC (57) ABSTRACT

A method for the operational control of an inverter designed for DC/AC voltage conversion that has at least one direct-voltage input and that can be connected to a power supply grid via at least one alternating-voltage output, the inverter being involved in a power flow interaction with the grid in such a manner that, during operation of the inverter, a leakage current $I_A$ can occur, wherein the leakage current $I_A$ is controlled in the operational control.

14 Claims, 9 Drawing Sheets

(51) Int. Cl.
*H02M 1/00* (2006.01)
*H02M 1/12* (2006.01)
*H02J 3/38* (2006.01)

(52) U.S. Cl.
CPC ...... *H02M 2001/123* (2013.01); *Y02E 10/563* (2013.01); *Y10T 307/50* (2015.04)

(56) References Cited

U.S. PATENT DOCUMENTS

| | | |
|---|---|---|
| 2002/0118559 A1 | 8/2002 | Kurokami et al. |
| 2006/0067092 A1 | 3/2006 | Nondahl et al. |
| 2009/0244936 A1* | 10/2009 | Falk et al. ............ 363/40 |
| 2010/0091532 A1* | 4/2010 | Fornage ............ 363/95 |

FOREIGN PATENT DOCUMENTS

| | | |
|---|---|---|
| EP | 1641111 A2 | 3/2006 |
| JP | 04-010536 | 1/1992 |
| JP | 11-069661 | 9/1999 |
| JP | 2001501631 A | 2/2001 |
| JP | 2007295786 A | 11/2007 |
| JP | 2008220109 | 9/2008 |
| WO | 2010078669 A1 | 7/2010 |

OTHER PUBLICATIONS

European Search Report dated Sep. 27, 2010 for European Application No. 10159233.5. 8 Pages.
International Search Report Dated Jan. 25, 2012 for International Application No. PCT/EP2011/055343. 15 Pages.

\* cited by examiner

METHOD FOR THE OPERATIONAL CONTROL OF AN INVERTER

REFERENCE TO RELATED APPLICATIONS

This application is a continuation of International Application number PCT/EP2011/055343 filed on Apr. 6, 2011, which claims priority to European Application Number 10159233.5 filed on Apr. 7, 2010, the contents of which are hereby incorporated by reference.

FIELD

The invention relates to a method for the operational control of an inverter designed for DC/AC voltage conversion.

BACKGROUND

In electrical installations in which a direct voltage generated by photovoltaic elements is converted into alternating voltage by means of transformerless inverters, capacitive leakage currents may occur that depend on the circuit and the modulation method selected, since the potential of the solar generator can fluctuate with respect to ground potential. This can influence a residual-current-operated protective device of the inverter negatively, for example.

One reason for the occurrence of leakage currents is an alternating-voltage component which, due to the circuit topology and the modulation of the inverter, is superimposed on the direct voltage generated by the photovoltaic elements. The leakage currents drain off to ground potential (PE) via so-called leakage capacitances (external ones of the photovoltaic element and those inside the inverter).

Although it is attempted to reduce this effect by optimizing the inverter topology, the effect of capacitive leakage currents can, however, occur in spite of such an optimization in certain operating states even in the case of transformerless inverters of more recent construction, especially in the case of inverters that are not operated in the conventional sine-delta-modulation.

Such a transformerless inverter of more recent construction, especially optimized and advantageous with regard to its efficiency, in so-called "three-point topology" is disclosed in EP 2 107 672 A2. It shows a three-phase transformerless inverter with a link, the inputs on the direct-voltage side of which are connected to one another by two series-connected capacitances, the two capacitances defining a center voltage point that is not connected to the neutral conductor of the alternating-voltage grid.

In such a three-point topology, the voltage at the input $U_{DC}$ to PE is, in case of normal pulse width modulation (PWM) that is generated in accordance with the common principle of sine-delta modulation, a direct voltage so that in this case, in which a link voltage at the input of the inverter bridge must be at least as large as twice the peak voltage of the line voltage signal so that the modulation degree of the PWM is less than or equal to 1, initially no leakage currents occur. If the link voltage is reduced to a value below twice the peak voltage of the line voltage signal, this results in overmodulation for the PWM, i.e. a modulation degree of greater than 1, which leads to distortion for the current at the inverter output.

To achieve as good an efficiency as possible, it is advantageous to keep the link voltage as low as possible. For this purpose, methods are known, especially for three-phase inverters, in which, for example, in the case of conventional sine-delta modulation, a time-variant offset, for example a delta signal with three times the line frequency or a sine signal with three times the line frequency is added so that, in spite of the occurrence of link voltage values below twice the peak voltage of the line voltage signal in the PWM signal itself, no overmodulation occurs, and thus also no current distortion of the inverter output signal fed into a grid occurs. Such modulation methods include, for example, also the methods known by the terms "space vector modulation" or "sine-delta modulation with third harmonic".

In the case of modified sine-delta modulation methods, especially in the case of the aforementioned methods of sine-delta modulation with time-variant offset, an alternating voltage component with three times the line frequency occurs, for example, but not only, in the aforementioned transformerless inverter from EP 2 107 672 A2, due to its topology, between the voltage center point at the input and PE, which causes a capacitive alternating current via the leakage capacitances (leakage current).

Inverters usually have a residual-current-operated protective device, which detects the differential currents on the alternating-current side and, in the case of a fault, e.g., in order to avoid danger to persons or damage to the inverter itself, switches the inverter off. However, the measured differential current contains not only the fault current actually to be detected but additionally in a vectorial sum also a leakage current, which may be present, so that leakage currents that are too large can lead to an erroneous triggering of the residual-current-operated protective device and, thus, to an unwanted switching-off of the inverter. Refraining from the use of modulation methods in which leakage currents can occur due to topology will again worsen the efficiency and, therefore, does not represent a suitable solution to this problem.

SUMMARY

The invention, in one embodiment, is directed to limiting the disadvantageous effects of leakage currents on the operation and on the operational behavior of inverters and at the same time also ensuring as good an efficiency as possible.

A method for the operational control of an inverter designed for DC/AC voltage conversion is disclosed, the inverter having at least one direct-voltage input and being connectable to a power supply grid via at least one alternating-voltage output—or two or more alternating-voltage outputs. In one embodiment the inverter is involved in a power flow interaction with the grid, in such a manner that, during operation of the inverter, a leakage current $I_A$ can occur, wherein the leakage current $I_A$ is controlled by the operational control.

Due to the fact that the leakage current or currents is or are controlled, it is possible to ensure in a simple manner that predetermined maximum values for leakage currents are not exceeded.

In principle, the invention is suitable for different inverters in which leakage currents, especially capacitive leakage currents to ground potential, occur at the input side. In particular, these are transformerless inverters of different topologies, as well as topologies in which the neutral conductor (N potential) of the grid is not connected. The method is suitable in one embodiment for three-phase inverters which can have both a two-point topology (e.g. a so-called B6 bridge) and a multi-point topology, for example a three-point topology (e.g. an NPC "Neutral Point Connected" bridge or a BSNPC "Bipolar Switch Neutral Point Connected") bridge.

In one embodiment the method is used for the operational control of a transformerless inverter, particularly in the case of an inverter that does not have a galvanic connection to or with an N and/or PE potential of the power supply grid.

In particular, the invention also provides for an operation, optimized with regard to the efficiency, of the inverter in spite of the occurrence of capacitive leakage currents at the input.

In the operational control of the inverter for driving a power component assembly of the inverter that has power semiconductors, a PWM method is used in one embodiment and the actual operational control is done by means of a control device. In this context, the method is suitable especially—but not exclusively—for pulse width modulation types in which a modified sine-delta modulation, especially with time-variant offset, is used for generating the PWM signal. In this context, it is advantageous if the amplitude of the offset is not constant but is always chosen to be just as large as is necessary for avoiding overmodulation of the generated PWM signal. As a result, an offset with zero amplitude, and, thus, conventional sine-delta modulation, is obtained for values of the link voltage at or above twice the peak voltage of the line voltage signal.

Since, in an advantageous embodiment of the method according to the invention, the link voltage influences the leakage current, this can be used, in turn, for implementing a control of the leakage current in a simple manner. The leakage current $I_A$ is thus controlled in one embodiment by changing a target value setting for the link voltage $U_{ZwK\ TGT}$ at the input of the inverter bridge. Thus, control can always take place, for example, when the link voltage $U_{ZwK}$ has a voltage value that is greater than a predeterminable first voltage limit ($U_1$) and when the link voltage $U_{ZwK}$ has a voltage value which is less than a predeterminable second voltage limit ($U_2$).

The leakage current $I_A$ is controlled in one embodiment when the inverter is in an operating state in which at least one certain condition is met. According to a particularly advantageous embodiment, this condition can comprise when the inverter is operated within a range in which the offset of the modulation method has a value unequal to zero. This is particularly advantageous since the leakage currents to be controlled occur in certain inverter topologies only when the inverter is operated within this range. This range is limited upward by a link voltage value $U_2$ that corresponds to twice the peak voltage of the line voltage signal and downward by a minimum link voltage value $U_1$ up to which an operation without current distortion in the inverter output signal is possible with the respective method of sine-delta modulation with time-variant offset.

The condition can also comprise when the leakage current $I_A$ has a current value that is greater than a predeterminable first current limit, the leakage current $I_A$ then being controlled to a current value that is less than or equal to a second predetermined current limit.

It is suitable if the following holds for the first current limit: $I_A=0$ and the following holds for the second current limit: $I_A=I_{MAX}$, $I_{MAX}$ being a current value above which the inverter is transferred into a safe state by its residual-current-operated protective device.

It is advantageous if the control of the leakage current is so slow that it does not respond to rapidly occurring fault currents, which should trigger the residual-current-operated protective device, but, at the same time, is also fast enough, such that occurring leakage currents are controlled before the residual-current-operated protective device responds to them.

It is further advantageous if the inverter has a DC/DC converter (for example, a boost converter or a buck converter or a combined buck-boost converter) at the input so that in the operational control, apart from controlling the leakage current, maximum power point tracking can also be performed for maximizing a power delivered by the photovoltaic elements without these two control systems having a disadvantageous effect on one another.

BRIEF DESCRIPTION OF THE DRAWINGS

In the text which follows, the invention will be described in greater detail by means of exemplary embodiments, with reference to the drawings, in which.

DETAILED DESCRIPTION

Figure 1:
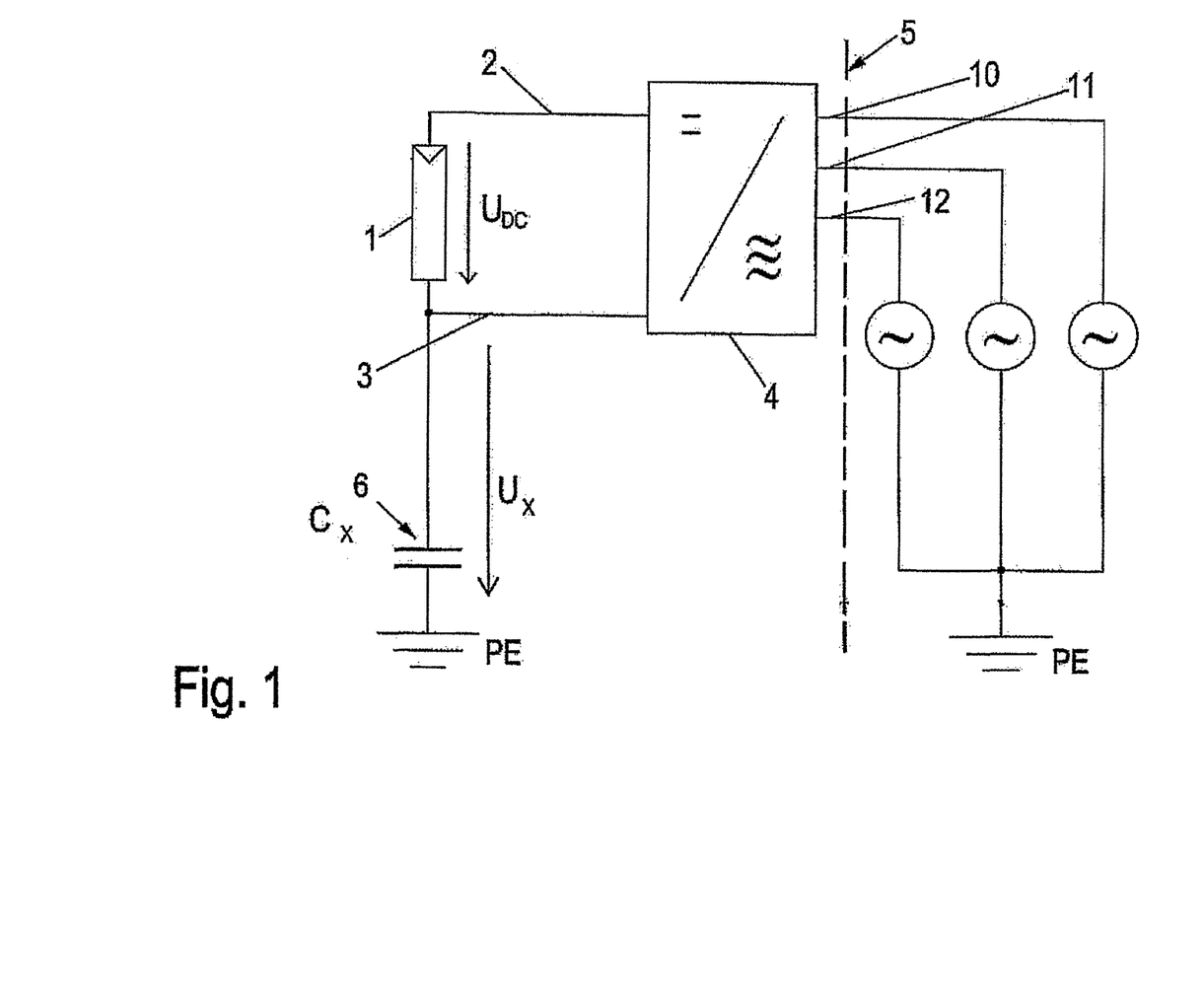
FIG. 1 is a basic block diagram of a system with an inverter connected between a PV generator and a power grid.
Figure 2:
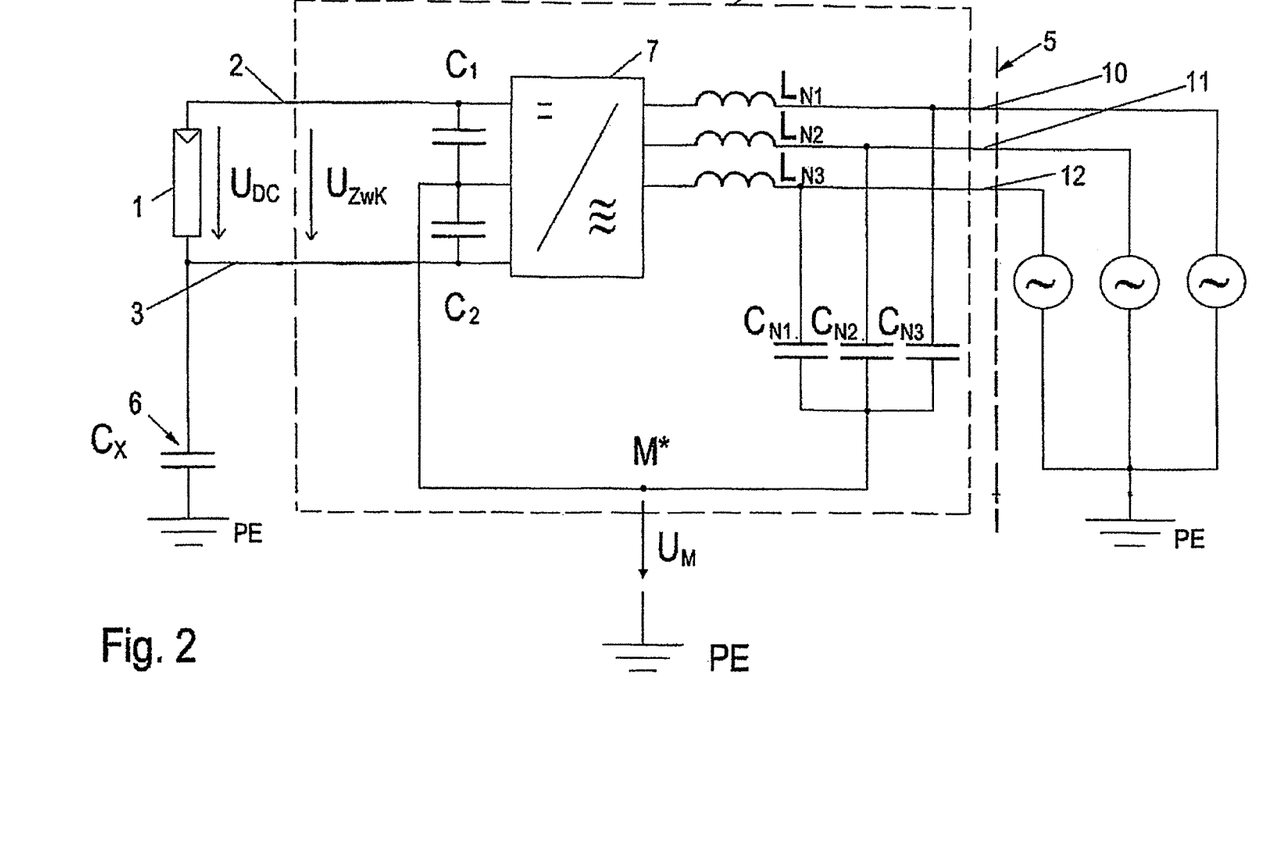
FIG. 2 is a basic block diagram of a system analogous to FIG. 1, with an inverter that has a three-point topology.

In the following text, FIGS. 1 and 2 are used for initially describing the configuration of a PV system as well as an example, highly simplified transformerless inverter topology.

In an electrical installation of the type of FIG. 1, a photovoltaic generator (PV generator) 1 comprising at least one photovoltaic element generates a direct voltage that is supplied to the direct-voltage inputs of an inverter 4 via electrical lines 2 and 3. The direct voltage supplied to the inverter 4 is converted by the inverter into an alternating voltage and fed into a power supply grid (represented by the components on the right of line 5) at outputs 10, 11 and 12.

A capacitance $C_X$ 6 represents the so-called equivalent leakage capacitance, i.e., the sum of all leakage capacitances via which leakage currents may flow. The alternating-voltage components of a voltage $U_X$ between a ground potential (PE) and the electrical line 3 cause the leakage currents flowing via the capacitance $C_X$ 6. The voltage thus represents a measure of the leakage current $I_A$ flowing. As an alternative or additionally, the voltage between the electrical conductor 2 and the ground potential (PE) can also be used as a measure of a leakage current.

The inverter 4 has component assemblies not shown in detail here, such as a power component assembly with power semiconductors and a control device (with a driving assembly) and possibly further assemblies such as filters, a user interface, various interfaces, measuring devices, etc.

FIG. 2 shows a PV system with an inverter in "three-point topology". An exemplary embodiment of such an inverter is described in greater detail, for example, in EP 2 107 672 A2.

The capacitances $C_1$ and $C_2$ shown additionally are used for dividing the direct voltage generated by the PV generator and for forming three voltage levels.

Furthermore, FIG. 2 shows a line filter with the components $L_{N1}$, $L_{N2}$, $L_{N3}$, $C_{N1}$, $C_{N2}$ and $C_{N3}$, the bottom end of which is connected to the connection between the two capacitances $C_1$, $C_2$ and the center voltage input of the inverter. This connection is designated by the circuit point M*. The voltage $U_M$ between the circuit point M* and the ground potential (PE) represents a measure of the leakage current $I_A$. The neutral N-conductor (not shown in FIG. 2) of the alternating voltage grid may be connected to the inverter in order to be used as reference potential for measuring purposes, particularly also as a reference for the residual-current-operated protective device. However, it is not conductively connected to the actual assemblies of the inverter that are used for voltage conversion, thus, the potential of M* is free with respect to PE/N.

The inverter bridge 7 contains the bridge circuit comprising power-electronic switches (for example an NPC bridge or a BSNPC bridge) for converting direct current at the input into alternating current at the output.

Figure 3A:
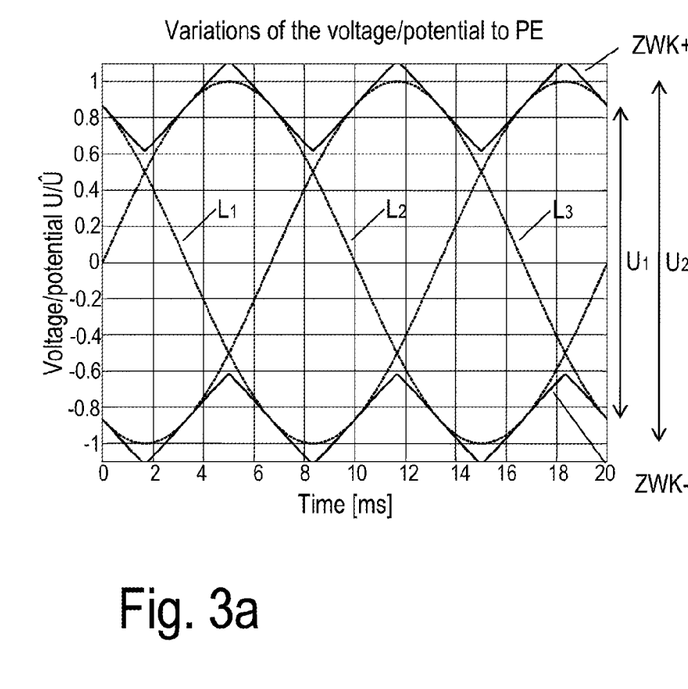
FIGS. 3a and 3b are graphs illustrating the variation in time for the link potential and for the alternating output voltage with respect to M* and with respect to PE when the inverter is driven by sine-delta modulation with delta-shaped offset.
Figure 3B:
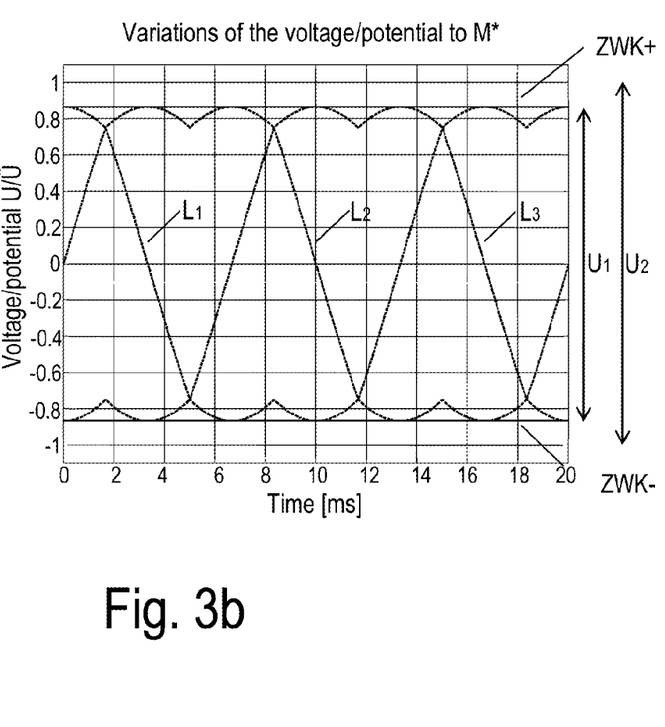
Figure 3C:
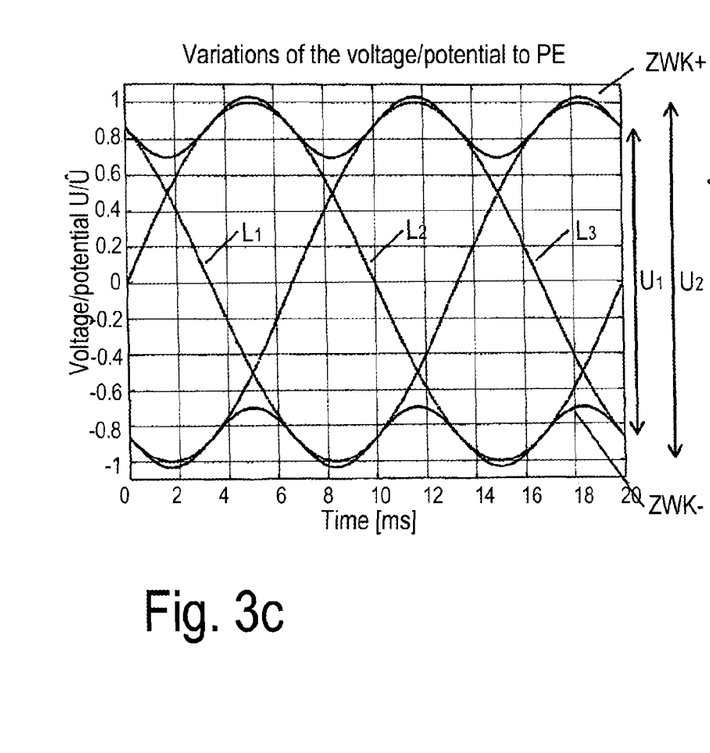
FIGS. 3c and 3d are graphs illustrating the variation in time for the link potential and for the alternating output voltage with respect to M* and with respect to PE when the inverter is driven by sine-delta modulation with sinusoidal offset.
Figure 3D:
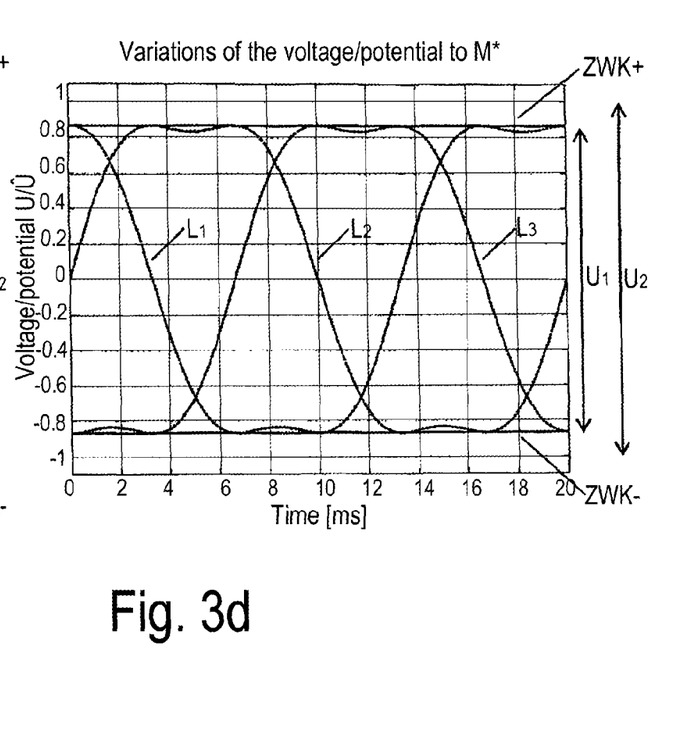

The inverter is driven/controlled by means of a pulse width modulation that is preferably generated in one embodiment by means of a sine-delta modulation with time-variant offset. FIGS. 3a and 3b show, for example, the case of sine-delta modulation with delta-shaped offset, also known as "space vector modulation", while FIGS. 3c and 3d show the case of sine-delta modulation with sinusoidal offset, also known as "sine-delta modulation with third harmonic". In addition, other forms of modified sine-delta modulation are also possible, especially such with other shapes of the offset, which allow a direct-voltage signal with a value of less than twice the peak voltage of the line voltage signal to be converted into an inverter output signal that does not exhibit any current distortions. It is advantageous in one embodiment if the amplitude of the offset is not constant but is always chosen to be of just such a magnitude as is necessary such that for a given link voltage no current distortions are obtained.

FIGS. 3a-3d show in each case the superimposed three line voltage variations $L_1$, $L_2$ and $L_3$ and the variations of the positive (ZwK+) and negative (ZwK−) link potential with respect to the M* potential (FIGS. 3b and 3d) and with respect to the ground potential PE (FIGS. 3a and 3c). In this context, it can be seen that the positive and negative potentials of the link circuit always envelop the three line voltage variations.

If the inverter is operated in sine-delta modulation with time-variant offset, the link voltage $U_{ZwK}$=(ZwK+)−(ZwK−) can, thus, drop below the value $U_2$ shown in FIGS. 3a 3b, 3c and 3d (i.e., twice the value of the peak voltage Û of the line voltage signal). In this case, however, there will be fluctuations of the potential at the input with respect to the ground potential PE. These fluctuations, which have three times the line frequency, cause leakage currents (see FIG. 4).

Although, in principle, in the case of sine-delta modulation with time-variant offset the link voltage can be lower than twice the value of the peak voltage Û of the line voltage signal, it may only be of a magnitude such that the link potential variation always envelops the line voltage variations, i.e., the link potential may not be lower than the value $U_1$ as can be seen in FIG. 3a. Thus, the following holds for operation within the range of modulation with offset:

$$U_1 < U_{ZwK} < U_2.$$

Figure 4:
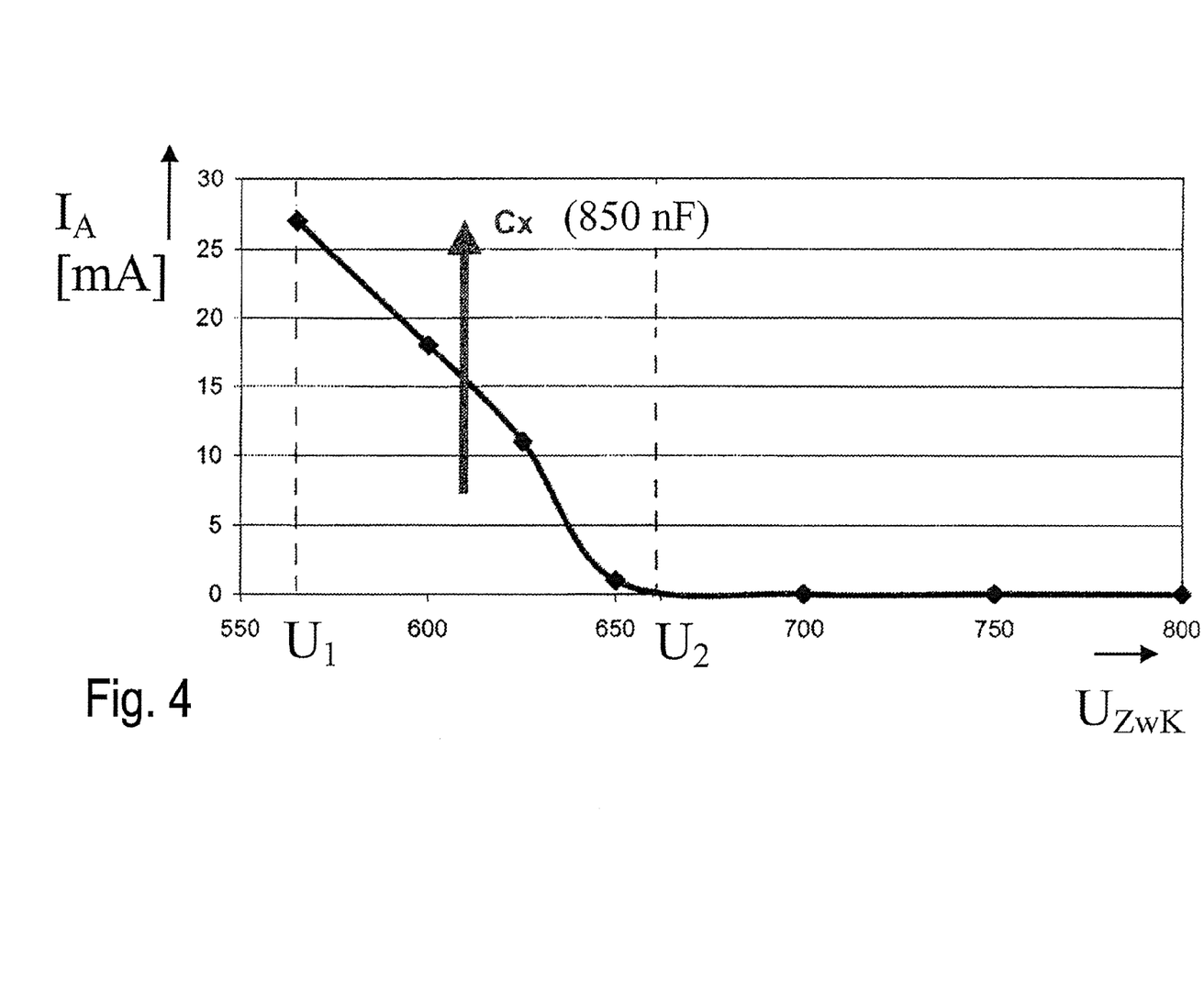
FIG. 4 is a graph that shows the variation of the (effective) leakage current over the link voltage.

FIG. 4 shows an example dependence of a leakage current $I_A$ on the link voltage $U_{ZwK}$ (cf. the voltage between conductors 2 and 3 in FIG. 2) with a leakage capacitance of $C_X$=850 nF. The arrow pointing upward illustrates the increase in leakage current $I_A$ with increasing leakage capacitance $C_X$.

During the operation of an inverter of the type mentioned, limits exist for the leakage current $I_A$. Thus, the leakage current must not rise above a maximum value $I_{MAX}$, above which a disconnection from the power grid is done by the residual-current-operated protective device.

On the other hand, the requirement to operate inverters with the highest possible efficiency demands for the link voltage $U_{ZwK}$ to be reduced below the value $U_2$ which, in turn, results in a leakage current $I_A$ (compare FIG. 4).

It has hitherto been proposed to limit the permissible leakage capacitances to a maximum value so that leakage currents occurring do not exceed a particular value. However, this has the result that certain photovoltaic elements having leakage capacitances that are too high cannot be used in combination with certain inverter topologies. It has also been proposed to deactivate the operation with link voltages below twice the peak voltage of the line voltage signal when leakage currents occur that are too high, which, however, leads to a reduction of the efficiency, which may eventually happen also temporarily. Both of these options are disadvantageous.

Also, the leakage capacitances are not constant in time but can fluctuate, e.g., due to condensation, humidity or other influences. PV systems, therefore, have always had to be dimensioned up to now based on the worst conditions in order to prevent frequent switching-off due to leakage currents that were too high.

In order to achieve the optimum operational control of the inverter, as possible, taking into consideration the limitations described, it is therefore proposed to control the leakage current $I_A$ in such a manner that the leakage current $I_A$ does not exceed a maximum value $I_{MAX}$ while still operation with the highest possible efficiency is achieved by keeping the link voltage as low as possible by using suitable modulation, for example sine-delta modulation with time-variant offset, and continuous control, with the leakage current acting as control quality criterion.

For this purpose, the link voltage $U_{ZwK}$ is reduced, for example, by changing the target value setting $U_{ZwK\ TGT}$ for the link voltage control as long as the leakage current $I_A$ does not exceed a particular maximum value $I_{MAX}$.

If the leakage current $I_A$ threatens to exceed the maximum value $I_{MAX}$, the link voltage $U_{ZwK}$ is increased by increasing the target value setting $U_{ZwK\ TGT}$, which leads to a reduction of the leakage current $I_A$. During this, the PWM signal is always adapted by the modulation method used, such that for the respective link voltage at the input of the inverter no current distortions occur in the signal at the inverter output.

FIG. 4 also shows two voltage values $U_1$ and $U_2$ for the link voltage $U_{ZwK}$. $U_1$ designates the value of the link voltage $U_{ZwK}$ that is, for example with sine-delta modulation with time-variant offset, required at minimum for generating the line voltage amplitudes to be fed in. $U_2$ designates the value of the link voltage below which the inverter would be operated in overmodulation (modulation index M>1) with conventional sine-delta modulation.

The values $U_1$ and $U_2$ are dependent on the type of modulation and also on the line voltage. They are determined by a central processing unit, or specified by it, respectively.

Figure 5:
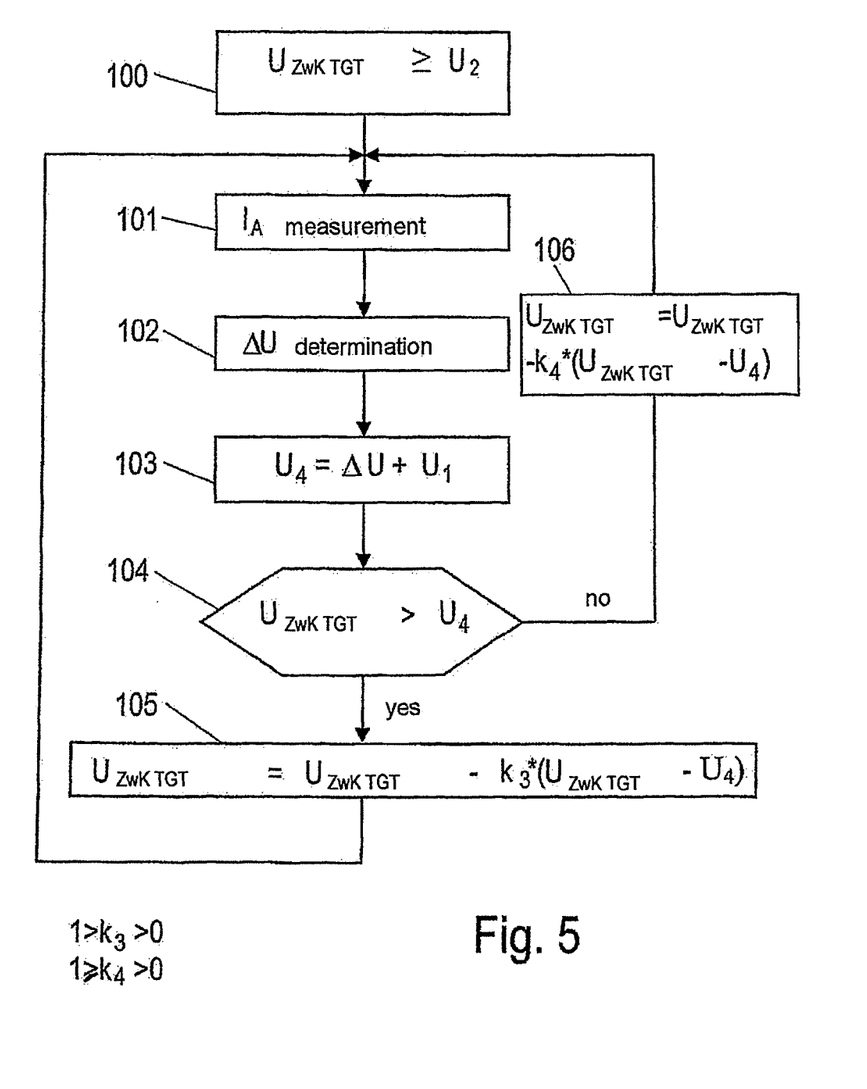
FIGS. 5 and 7 are flowcharts that illustrate two possible embodiments of the method for controlling the leakage current.

In the text that follows, the exemplary flowchart shown in FIG. 5 is described.

At first, at 100, a target value setting for the link voltage $U_{ZwK\ TGT}$ is set to a starting value above or equal to $U_2$.

At 101, the actual value of the leakage current $I_A$ is measured.

Figure 6:
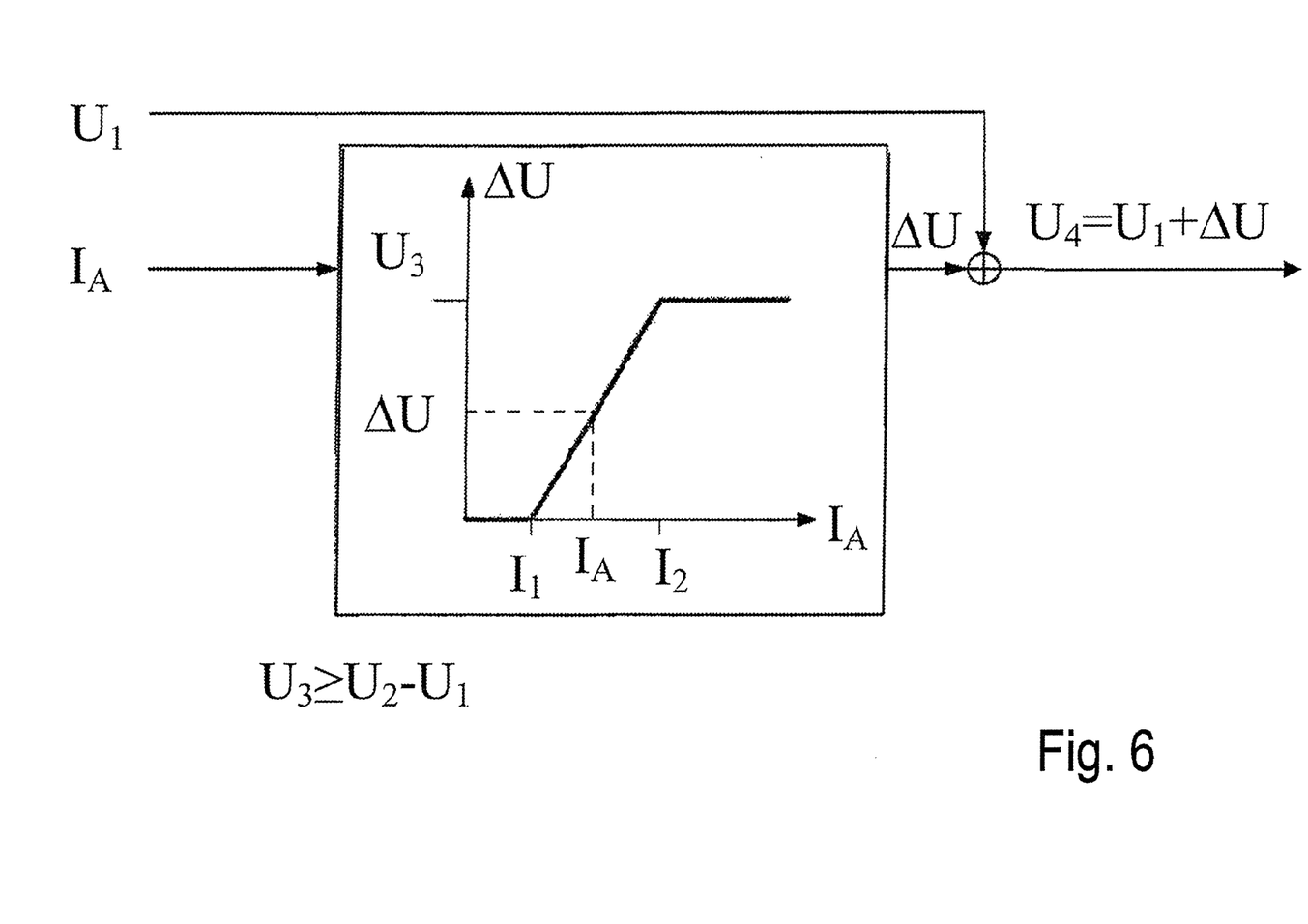
FIG. 6 is a graph illustrating a U/I characteristic for controlling the leakage current.

With the measurement value $I_A$, a voltage difference $\Delta U$ is determined at 102 by using the characteristic $\Delta U = f(I_A)$ shown exemplarily and schematically in FIG. 6. The larger the amount of the leakage current $I_A$ measured, the larger the voltage difference $\Delta U$ is. The steepness of the characteristic shown in FIG. 6 specifies the amount by which $\Delta U$ is changed when the measured leakage current $I_A$ changes by a particular amount (applies to: $I_1 < I_A < I_2$, cf. FIG. 6).

At 103, a new lower limit value $U_4$ is formed from the lower limit value $U_1$, which is predetermined by the modulation method, by adding the voltage difference $\Delta U$ already determined. The upper limit $U_3$ for the voltage difference $\Delta U$, given in the characteristic according to FIG. 6, ensures, due to the $U_3 \geq U_2 - U_1$ relationship, that the new lower limit value $U_4$ is not increased further after the upper voltage limit $U_2$ is reached or exceeded, since there is no further voltage dependence of the leakage current $I_A$ on the link voltage $U_{ZwK}$ via $U_2$ according to FIG. 4 and, thus, an increase in the link voltage $U_{ZwK}$ cannot cause any further reduction in the leakage current $I_A$. Such a situation can occur, for example, when a base leakage current is present that is greater than the current value $I_2$. As can be seen in conjunction with FIG. 6, $U_1$ is retained as lower limit below the current value i.e. $U_4 = U_1$, since $\Delta U = 0$.

By means of the evaluation shown at 104, it is determined whether the actual target value setting for the link voltage $U_{ZwK\ TGT}$ is greater than the lower voltage limit $U_4$. If this is the case ("yes branch"), the current target value setting for the link voltage $U_{ZwK\ TGT}$ is reduced in accordance with the example calculation rule given at 105. In this action, the dynamic range and the absolute value of this adaptation are influenced by a control parameter $k_3$, which is advantageous to be less than one and greater than zero for this calculation rule according to one embodiment. Subsequently, the leakage current $I_A$ is measured again and the lower voltage limit value $U_4$ is adapted again, beginning at 101.

If the condition at 104 is not met ("no branch"), i.e., if the actual target value setting for the link voltage $U_{ZwK\ TGT}$ is below the lower voltage limit $U_4$ or at this limit, the target value setting for the link voltage $U_{ZwK\ TGT}$ is increased in accordance with the example calculation rule given at 106. In this action, the dynamic range and the absolute value of this adaptation are influenced by a control parameter $k_4$, which is advantageous to be less than or equal to one and greater than zero for this calculation rule according to one embodiment. Subsequently, the leakage current $I_A$ is measured again and the lower voltage limit value $U_4$ is adapted again, by passing through the loop and beginning at 101.

Instead of the example calculation rules 105 and 106, respectively, any other filtering functions that are appropriate in the field of control engineering can also be used. Also for the characteristic $\Delta U = f(I_A)$ other realizations than the one given in FIG. 6 are possible.

Furthermore, the control parameters $k_3$ and $k_4$ do not need to be a constant but can be changed adaptively, for example, during the operation.

Figure 7:
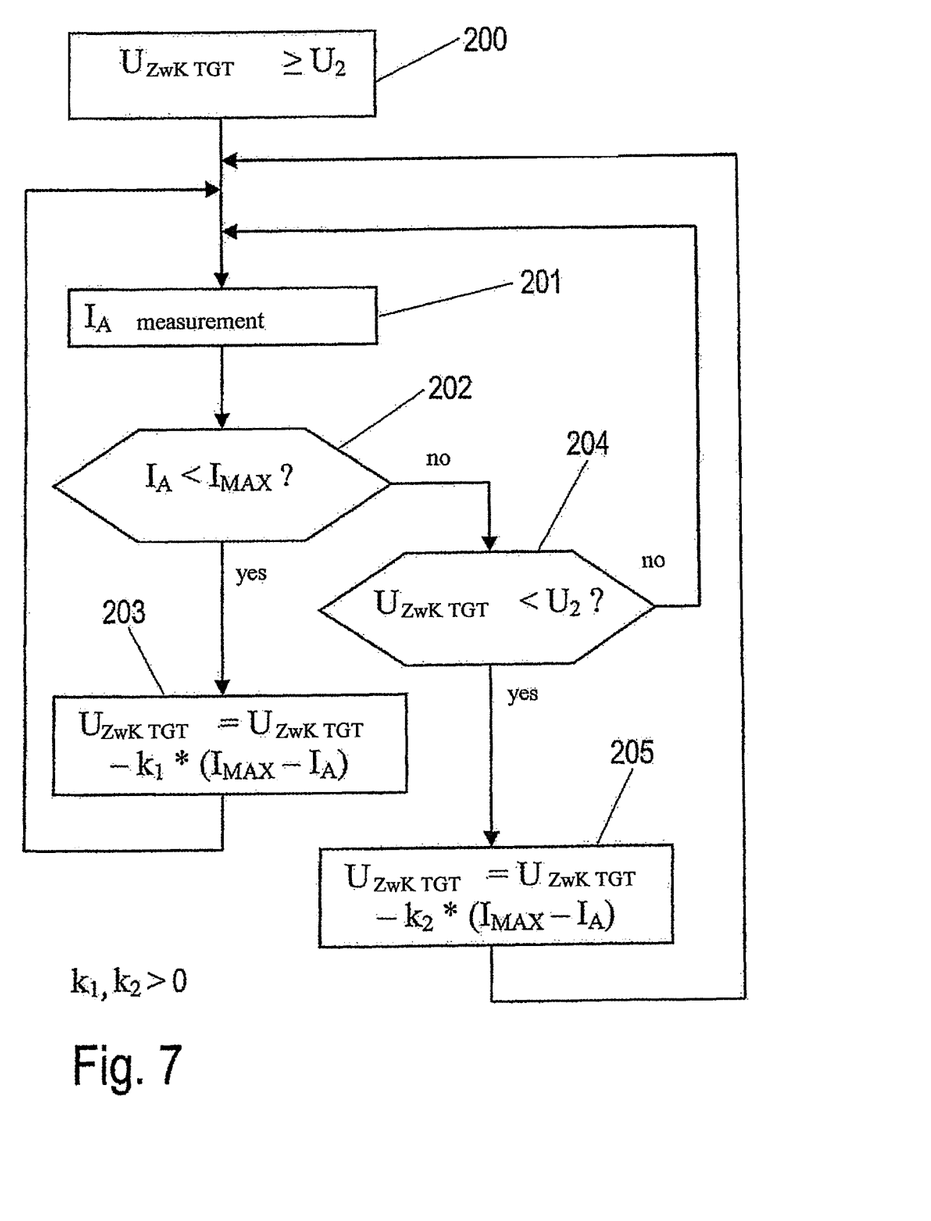

FIG. 7 shows a further possibility for implementing the method according to the invention without the characteristic shown in FIG. 6.

At first, at 200, a target value setting for the link voltage $U_{ZwK\ TGT}$ is set to a starting value above or equal to $U_2$.

At 201, the actual value of the leakage current $I_A$ is measured.

If the measured value of $I_A$ is below the limit $I_{MAX}$, the process branches at 203 ("yes branch") in the branching act 202 and the target value setting for the link voltage $U_{ZwK\ TGT}$ is reduced in accordance with an example calculation rule at 203. The dynamic range and the absolute value of this adaptation are influenced here by a control parameter $k_1$ which is advantageous to be greater than zero for this calculation rule according to one embodiment. Subsequently, the leakage current $I_A$ is measured again, beginning at 201, and checked whether to exceed $I_{MAX}$.

If the condition at the branching act 202 is not met ("no branch"), i.e., if the leakage current $I_A$ has reached or exceeded the value $I_{MAX}$, the target value setting for the link voltage $U_{ZwK\ TGT}$ is increased by means of an example calculation rule specified at 205. The dynamic range and the absolute value of this adaptation are influenced here by a control parameter $k_2$ which is advantageous to be greater than zero for this calculation rule according to one embodiment. Subsequently, the leakage current $I_A$ is measured again and checked whether it exceeds $I_{MAX}$ by passing through the loop beginning at 201.

At 204, an additional check is done as to whether the actual target value setting for the link voltage $U_{ZwK\ TGT}$ is below the upper voltage limit value $U_2$, and, if not, the increase in target value setting for the link voltage $U_{ZwK\ TGT}$ is bypassed at 205. This prevents the target value setting for the link voltage $U_{ZwK\ SET\ TGT}$ from being raised above the voltage limit $U_2$, above which, according to FIG. 4, there is no further voltage dependence of the leakage current $I_A$ on the link voltage $U_{ZwK}$. An increase in the link voltage $U_{ZwK}$ therefore cannot produce any further reduction in the leakage current $I_A$. Such a situation may occur, for example, if a base leakage current is present that is greater than $I_{MAX}$.

Instead of the example calculation rules at 203 and 205, respectively, any other filtering functions that are appropriate in the field of control engineering can also be used. As well, the control parameters $k_1$ and $k_2$ do not need to be constants but can be changed adaptively, for example, during the operation.

According to the previous explanations, the link voltage at the input of the inverter bridge is set by the method according to the invention to the lowest possible value that is optimal for operation in view of efficiency. In this manner, the invention, in particular, allows inverters to be operated with the lowest possible link voltage at the input of the inverter bridge in order to optimize its efficiency although leakage currents can occur in such a type of operation. This is done by keeping these leakage currents below a maximum value, that is not to be exceeded, by means of a control process.

In an arrangement according to FIG. 2, the link voltage $U_{ZwK}$ at the input of the inverter bridge 7 is, at the same time, also the voltage $U_{DC}$ at the PV generator 1. In this context, when using the method according to the invention, it has to be taken into consideration that, in the case of PV installations, there is usually a further requirement for the generator voltage $U_{DC}$ that results from the so-called "MPP Tracking". Such methods, which, by setting a particular generator voltage, ensure that the PV generator operates at the point of maximum power delivery (Maximum Power Point, MPP), are known to the one skilled in the art and, therefore, do not need any further explanations in detail here.

If then the generator voltage $U_{DC}$ required by MPP Tracking is higher than the target value for the link voltage $U_{ZwK\_TGT}$, as determined by the method according to the invention, the generator voltage required by MPP Tracking is, in one embodiment, to be set in the method according to the invention. If, however, the generator voltage $U_{DC}$ required by MPP Tracking is less than or equal to the target value for the link voltage $U_{ZwK\_TGT}$, as predetermined by the method according to the invention, then the voltage value $U_{ZwK\_TGT}$, as determined by the method according to the invention, is set in view of the leakage current $I_A$ to be limited. This value is then usually no longer identical to the voltage value at which the PV generator is operated at the point of maximum power delivery. It has to be taken into consideration also that operating the arrangement according to FIG. 2 is no longer possible when generator voltages are below $U_1$.

Figure 8:
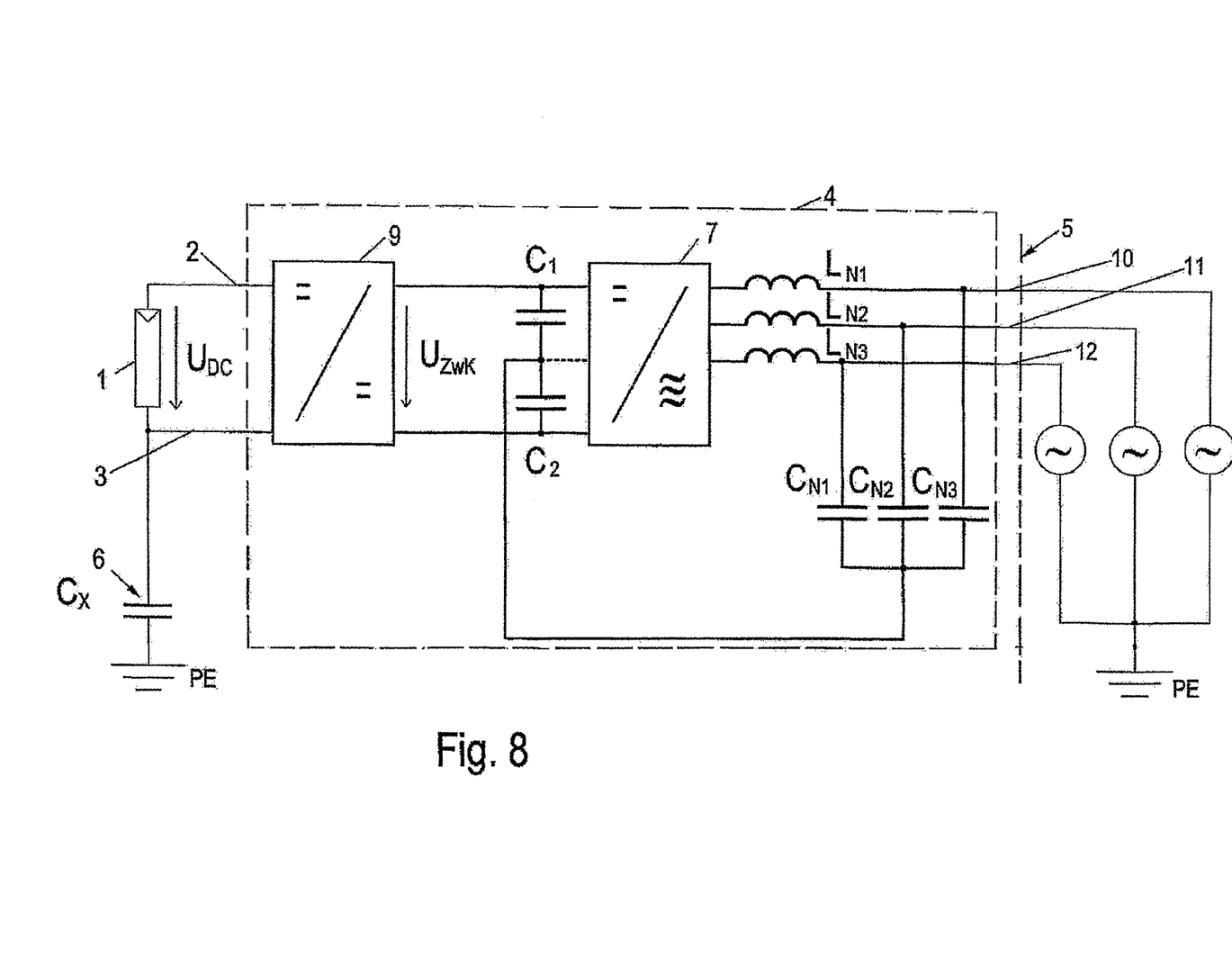
FIG. 8 is a basic block diagram of a system analogous to FIG. 1, with an inverter that has a three-point topology and a DC/DC converter at the input.

In order to extend the input voltage range of an inverter 4, it is known to connect an additional DC/DC converter upstream of the inverter bridge 7. FIG. 8 shows an example schematic representation of such a system according to FIG. 1 which, compared to the embodiment in FIG. 2, is supplemented by a DC/DC converter 9 in the direct voltage path of the PV generator. The DC/DC converter 9 can be constructed as a boost or a buck converter or also as combined buck-boost converter. When using certain DC/DC converters 9, especially those that do not have any galvanic isolation between input and output, leakage currents occur in an arrangement according to FIG. 8 in the same manner as in an arrangement according to FIG. 2. As a result of this the method according to the invention can also be used in an arrangement according to FIG. 8.

When using, for example, a boost converter as DC/DC converter 9 in an arrangement according to FIG. 8, it is possible, in contrast to an arrangement according to FIG. 2, to operate the system also at generator voltages $U_{DC}$ which, when conventional sine-delta modulation is used, can be below $U_2$ and, when modified sine-delta modulation is used, for example sine-delta modulation with time-variant offset, can be below $U_1$. In conjunction with the method according to the invention, the arrangement according to FIG. 8 also proves to be particularly advantageous, since now both voltage values can be set to their optimum independently of one another in the case when the generator voltage $U_{DC}$ required by MPP Tracking is less than or equal to the target value for the link voltage $U_{ZwK\_TGT}$ as determined by the method according to the invention. In this manner, it is possible to control the leakage current together with maximum power point tracking without these two control methods influencing one another in a disadvantageous way. In the case when the generator voltage $U_{DC}$ required by MPP Tracking is higher than the target value for the link voltage $U_{ZwK\_TGT}$ as determined by the method according to the invention, the generator voltage required by MPP Tracking is also set, in one embodiment, in the method according to the invention in an arrangement according to FIG. 8 with boost converter as DC/DC converter.

The invention claimed is:

1. A method for the operational control of a transformerless three-phase inverter designed for DC/AC voltage conversion that has at least one direct-voltage input configured to couple to an energy generation component and a link and that can be connected to a power supply grid via at least one alternating-voltage output, wherein the direct-voltage input of the inverter does not have a galvanic connection to or with a neutral connection N and/or earth ground potential of the power supply grid when coupled thereto, the inverter being involved in a power flow interaction with the grid, comprising:

operating the inverter by driving a power component assembly of the inverter that has power semiconductors according to a pulse width modulation scheme using a control device;

controlling a leakage current $I_A$ during inverter operation by changing a target value setting for a link voltage $U_{ZwK\_TGT}$ of a link of the inverter, wherein the link voltage is increased upon the leakage current approaching a particular value and the link voltage is a DC voltage.

2. The method as claimed in claim 1, wherein a pulse width modulation signal of the inverter is generated by modified sine-delta modulation.

3. The method as claimed in claim 2, wherein a pulse width modulation signal of the inverter generated by sine-delta modulation is generated with time-variant offset.

4. The method as claimed in claim 1, wherein the leakage current $I_A$ is controlled in an operational state of the inverter in which at least one condition is met.

5. The method as claimed in claim 4, wherein the at least one condition comprises a link voltage $U_{ZwK}$ at an input of an inverter bridge of the inverter is less than twice a peak voltage $\hat{U}$ of a line voltage signal.

6. The method as claimed in claim 4, wherein the at least one condition is met when a link voltage $U_{ZwK}$ at the input of the inverter bridge of the inverter has a voltage value that is greater than a predetermined first voltage limit ($U_2$) and that is less than a predetermined second voltage limit ($U_2$).

7. The method as claimed in claim 4, wherein the at least one condition is met when the leakage current $I_A$ has a current value that is greater than a predetermined first current limit, the leakage current $I_A$ then being controlled to a current value that is less than or equal to a second predetermined current limit.

8. The method as claimed in claim 7, wherein the predetermined first current limit equals zero and the predetermined second current limit is a current value above which the inverter is transferred into a safe state by a residual-current-operated protective device associated therewith.

9. The method as claimed in claim 1, wherein the leakage current $I_A$ is controlled by changing a target value setting, wherein in a determination of the change of the target value setting for a link voltage, a predetermined characteristic is evaluated.

10. The method as claimed in claim 1, wherein the inverter comprises a DC/DC converter at an input thereof.

11. The method as claimed in claim 1, further comprising performing a maximum power point tracking for maximizing a power delivered by a PV generator as the energy generator component.

12. The method of claim 1, wherein controlling the leakage current further comprises reducing the link voltage upon the leakage current being below the particular value.

13. The method of claim 1, further comprising disconnecting the at least one alternating-voltage output of the transformerless three-phase inverter from the power supply grid upon the leakage current rising above the particular value.

14. A method for the operational control of a transformerless three-phase inverter designed for DC/AC voltage conversion that has at least one direct-voltage input configured to couple to an energy generation component and a link and that can be connected to a power supply grid via at least one alternating-voltage output, wherein the direct-voltage input of the inverter does not have a galvanic connection to or with a neutral connection N and/or earth ground potential of the power supply grid when coupled thereto, the inverter being involved in a power flow interaction with the grid, comprising:
   operating the inverter by driving a power component assembly of the inverter that has power semiconductors according to a pulse width modulation scheme using a control device;
   controlling a leakage current $I_A$ during inverter operation by changing a target value setting for a link voltage $U_{ZwK\ TGT}$ of a link of the inverter; and
   obtaining a measure of the leakage current using a circuit point connecting a first inverter output, a second inverter output, a third inverter output and an inverter input.

* * * * *